US009924802B2

(12) United States Patent
Mills et al.

(10) Patent No.: US 9,924,802 B2
(45) Date of Patent: *Mar. 27, 2018

(54) RESTING APPARATUS (71) Applicants: Alan Mills, Tampa, FL (US); Julia Silva Rettig, Tampa, FL (US)

(72) Inventors: Alan Mills, Tampa, FL (US); Julia Silva Rettig, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/347,868

(22) Filed: Nov. 10, 2016

(65) Prior Publication Data

US 2017/0055714 A1 Mar. 2, 2017

Related U.S. Application Data (63) Continuation of application No. 14/709,690, filed on May 12, 2015, now Pat. No. 9,498,056.

(51) Int. Cl.
| A47C 16/00 | (2006.01) |
| F16M 11/20 | (2006.01) |
| B60N 2/48 | (2006.01) |
| A47C 7/38 | (2006.01) |
| F16M 11/26 | (2006.01) |

(52) U.S. Cl.
CPC ............ *A47C 16/00* (2013.01); *A47C 7/383* (2013.01); *B60N 2/4805* (2013.01); *F16M 11/2021* (2013.01); *F16M 11/26* (2013.01)

(58) Field of Classification Search
CPC ...... B60N 2/4805; B60N 2/4879; A47C 7/383
USPC ................. 297/397, 400, 402, 409; 5/640
See application file for complete search history.

(56) References Cited

U.S. PATENT DOCUMENTS

| 221,752 A * | 11/1879 | Taylor .................. B60N 2/4879 297/398 |
| 1,468,072 A | 9/1923 | Millas |
| 1,515,886 A | 11/1924 | Rumsey |
| 1,623,818 A | 4/1927 | Tichota |
| 3,188,079 A | 6/1965 | Boetcker et al. |
| 5,064,245 A | 11/1991 | Stephens |
| 5,303,890 A | 4/1994 | Carruth |

(Continued)

FOREIGN PATENT DOCUMENTS

| CN | 203073775 | 7/2003 |
| CN | 101584543 | 11/2009 |

(Continued)

OTHER PUBLICATIONS

ECR4KIDS Horseshoe Adjustable Activity Table, Hayneedle, Inc. 2002-2015; Retrieved from the Internet; www.hayneedle.com.

*Primary Examiner* — Rodney Mintz
(74) *Attorney, Agent, or Firm* — Greenberg Traurig, LLP (57) ABSTRACT A resting apparatus comprising two independent telescoping legs having two longitudinal rotatable leg anchors. The telescoping legs are attached to a locking mechanism that uses a bracket having a clip that fits into various holes depending on the user's desired sleep angle. The bracket is integrally formed in the body of the substantially u-shaped pillow. The telescoping legs also have a height locking system primarily comprising of two separate channels, a first channel allowing for vertical movement and side channels used to lock in the desired height. The resting apparatus can be broken down such that the rotatable leg anchors form a handle for ease of use while traveling.

15 Claims, 10 Drawing Sheets

(56) References Cited

U.S. PATENT DOCUMENTS

| | | | |
|---|---|---|---|
| 5,312,157 | A | 5/1994 | Logan, Jr. |
| 5,863,094 | A | 1/1999 | Endo |
| 5,873,626 | A | 2/1999 | Katz |
| 6,095,600 | A | 8/2000 | Mattingly |
| 6,270,160 | B1 | 8/2001 | Blake |
| 6,684,431 | B2 | 2/2004 | Splane, Jr. |
| 7,036,168 | B1 | 5/2006 | Knickerbocker |
| 7,337,483 | B2 | 3/2008 | Boucher et al. |
| D705,431 | S * | 5/2014 | Abramson .................. D24/184 |
| 9,150,130 | B2 | 1/2015 | Jackow |
| 9,079,520 | B1 * | 7/2015 | Hungerford ......... B60N 2/4879 |
| 9,226,587 | B2 | 1/2016 | Halimi et al. |
| 9,399,422 | B2 * | 7/2016 | Hungerford ............ B60N 2/487 |
| 9,498,056 | B1 * | 11/2016 | Mills ...................... A47C 7/383 |
| 9,656,581 | B2 * | 5/2017 | Brecht ............... B64D 11/0646 |
| 2002/0050009 | A1 | 5/2002 | Ley |
| 2003/0084513 | A1 | 5/2003 | Splane, Jr. |
| 2009/0302659 | A1 | 12/2009 | Goddu |
| 2011/0277238 | A1 | 11/2011 | Mabry |
| 2013/0152828 | A1 | 6/2013 | Chavira |
| 2013/0232696 | A1 | 9/2013 | Halimi et al. |
| 2013/0306831 | A1 | 11/2013 | Keen et al. |
| 2014/0033439 | A1 | 2/2014 | Berhanu |
| 2014/0312186 | A1 | 10/2014 | Mech |
| 2015/0001905 | A1 | 1/2015 | Jackow |
| 2015/0197168 | A1 * | 7/2015 | Hungerford ............ B60N 2/487 297/392 |
| 2016/0101716 | A1 * | 4/2016 | Brecht ............... B64D 11/0646 297/397 |
| 2016/0304012 | A1 * | 10/2016 | Hungerford ........... B60N 2/487 |
| 2016/0331126 | A1 * | 11/2016 | Mills .................... A47C 7/383 |

FOREIGN PATENT DOCUMENTS

| | | |
|---|---|---|
| CN | 202515574 | 11/2012 |
| DE | 19610097 | 10/1996 |
| JP | 2011240102 | 12/2011 |

* cited by examiner

RESTING APPARATUS

RELATED APPLICATION DATA

This application is a continuation of application Ser. No. 14/709,690, filed May 12, 2015, entitled "Resting Apparatus," the contents of which are fully incorporated by reference herein for all purposes.

BACKGROUND OF THE INVENTION

Field of the Invention

The present invention relates to a resting apparatus. More particularly, the present invention relates to a portable, adjustable, compact resting apparatus with a pillow able to be angled for neck support and locked at certain heights for comfort while in a seated position.

Description of the Background Art

Many travelers have difficulty sitting comfortably in an unsupported upright position for long periods of time. Presently, there exist several variations of pillows that can be used outside the bedroom for this purpose. Travelers tend to use these pillows on long trips for comfort while sleeping. The most common version of travel pillows is the neck pillow which wraps around the user's neck to provide neck support while the user sleeps. However, neck pillows lack the full support necessary to maximize comfort for a traveler.

There presently exists a need for a resting apparatus that is both portable and comfortable while maintaining the user's privacy that can be used while traveling. Other designs have been thought of for resting devices but each lack portability, privacy, and comfort.

For example, United States Patent Application Publication 2002/0050009 to Ley describes a portable travel pillow. The travel pillow features a pillow mounted to a table, with two interconnected shafts, and pads that rest on the user's legs while in use. The pillow table is not ergonomically designed to balance and support a user's head and neck. The pillow table uncomfortably forces a user's head and neck to one side or the other. Also, Ley's design does not provide an option for watching media while in use. The present invention features an ergonomically designed pillow, comfortable and balanced support, as well as features for privacy, height preference, and entertainment.

United States Patent Application Publication 2014/0033439 to Berhanu also discloses a sleeping table. In Berhanu, a detachable pillow is placed on a table whose angle can be changed using rods and an exposed notching system. A user's arms must raise and stretch around a bulky, uncomfortable table and the user's head and neck must twist to one side or the other when using Berhanu's table. Berhanu also features two support arms that are not freestanding and do not independently raise and lower. Berhanu has a locking mechanism using buttons, wires, and screws while requiring the user's body weight to keep the device in the desired position, unlike the present invention which can maintain a preferred angle without using the user's weight. Fragile buttons, wires, and screws may be lost or broken by careless users. The present invention provides a pillow support system that retains a comfortable and balanced head and neck position. The present invention features two support legs that raise and lower in height independently. Also, an enclosed, durable height adjustment channeling approach is used without the need for Berhanu's buttons, wires, and notches.

United States Patent Application Publication 2013/0232696 to Halimi et al. features a portable personal support with a U-shaped pillow may become shifted, detached and lost from the mounted head support. Halimi's base support is a table which requires the user to wear a belt in order to keep the personal support from slipping off the user's lap. The present invention provides a pillow that is integrally formed with a recessed bracket system permanently attached. No belts are necessary. Leg anchors keep the present invention secure on any user's lap.

Therefore, it is an object of this invention to provide an improvement which overcomes the aforementioned inadequacies of the prior art devices and methods and provides an improvement which is a significant contribution to the advancement of the resting apparatus support art.

Another object of this invention is to provide a resting apparatus for travelers that allows for the user's preferences regarding height, angle, and privacy to be maintained.

Another object of this invention is to provide a resting apparatus that can be quickly collapsed, conveniently stored, and easily transported.

Another object of this invention is to provide a resting apparatus that has an ergonomic and comfortable pillow that is integrally part of the support frame.

Another object of this invention is to provide a resting apparatus that is portable and able to be carried onto an airplane.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a resting apparatus comprising two telescoping legs having upper legs and lower legs, each having a proximal and distal end. Leg anchors are located at the proximal end of each of the lower legs and radial extensions are located at the proximal end of the upper leg. The leg anchors are rotatable such that when a leg anchor is rotated inwardly, it can act as a handle. Each lower leg is stabilized by a support brace having support columns slidably mounted to the lower legs so that the legs do not split apart while in use. Each lower leg also has a channel axially molded into the lower leg such that the extensions of the upper leg can be received. Each lower leg also has a plurality of side channels radially molded in the lower legs so that the apparatus can lock into a desired height by rotating the lower leg so that the extensions of the upper legs enter one of the side channels. Each leg features an independent height locking system so that the user can have two different heights for each leg depending on user preference, such as when the user crosses their legs. Each upper leg is mechanically connected to a bracket body which uses a u-shaped clip and a plurality of clip slots to determine the angle at which the device will rest. This bracket body is integrally formed with a generally u-shaped pillow so that the user can angle the pillow to the user's desired position.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The following description is of a preferred embodiment presently contemplated for carrying out the invention. This description is not to be taken in a limiting sense, but is made merely for the purpose of describing one or more preferred embodiments of the invention. The scope of the invention should be determined with reference to the claims.

Figure 1:
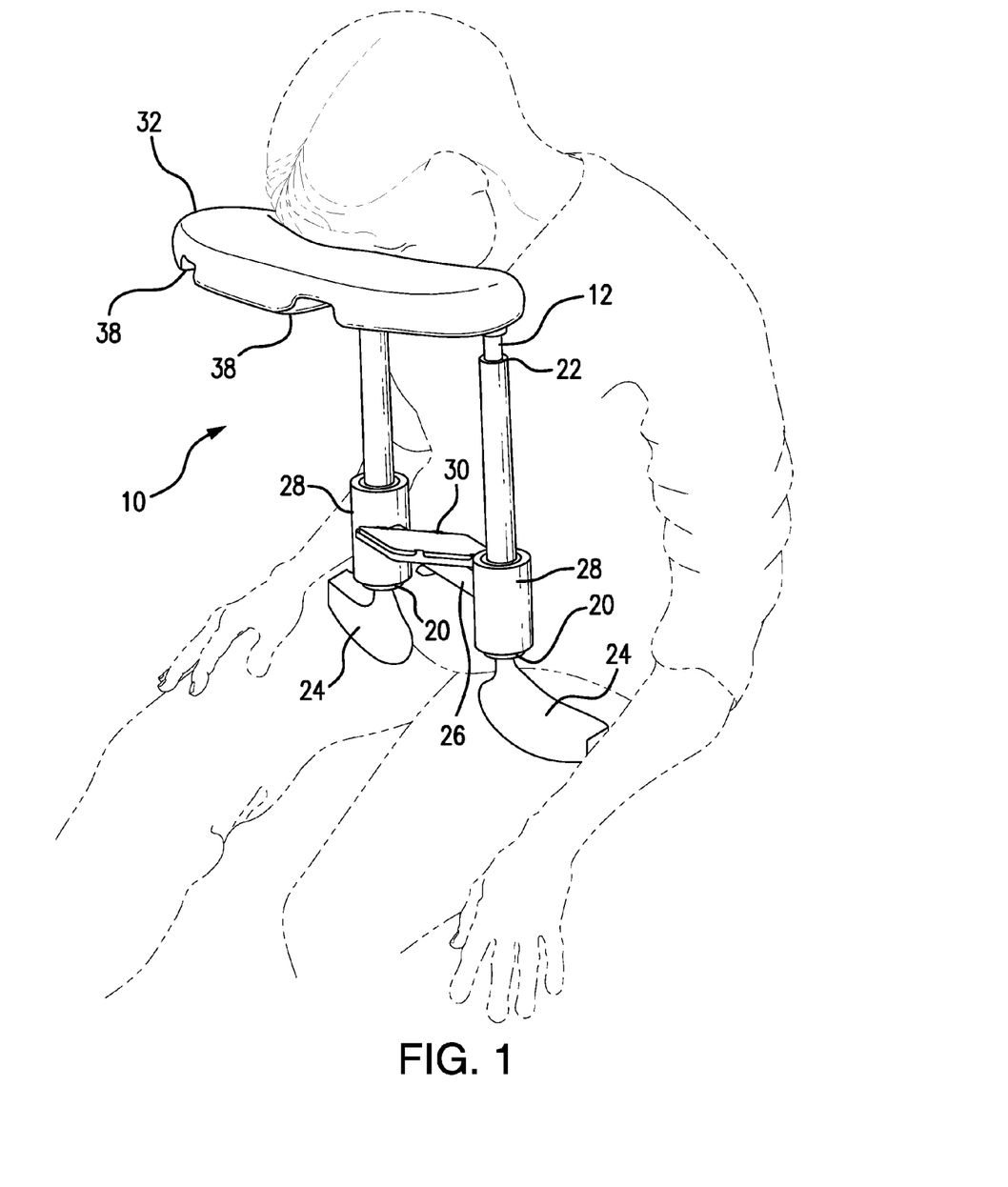
FIG. 1 is a perspective view of the resting apparatus in use.

The present invention is illustrated in FIG. 1. In this preferred embodiment, the resting apparatus 10 is comprised of upper legs 12 having an upper leg proximal end 14 and an upper leg distal end 16 and lower legs 18 having a lower leg proximal end 20 and a lower leg distal end 22. The lower legs 18 have a diameter greater than the diameter of the upper legs 12 such that the upper legs 12 are able to telescope with the lower legs 18. The lower legs 18 are axially rotatable around the upper legs 12. At least two leg anchors 24 are formed at the lower leg proximal end 20 of the lower legs 18. The leg anchors 24 are as rotatable as the lower legs 18 because the leg anchors 24 are mechanically attached to the lower legs 18. The lower legs 18 are stabilized by a support brace 26 and corresponding support columns 28. The support brace 26 and support columns 28 slide vertically along the lower legs 18. The support brace 26 can also have a media support 30 attached to said support brace 26 so that the user can use their phone or other media device while using the resting apparatus 10. As can be seen in the figure, the user places their face in the preferably u-shaped pillow 32 that is attached to the upper leg distal end 16 of the upper legs 12. The pressure created by the user placing their head on the pillow 32 is sent through the apparatus to the leg anchors 24 which are placed on the user's thighs or knees, depending on preference. The shape of the leg anchors 24 prevent the resting apparatus 10 from slipping from the user's lap. Preferably, the leg anchors 24 have a curved bottom for when the sleeping user shifts their weight.

Figure 2:
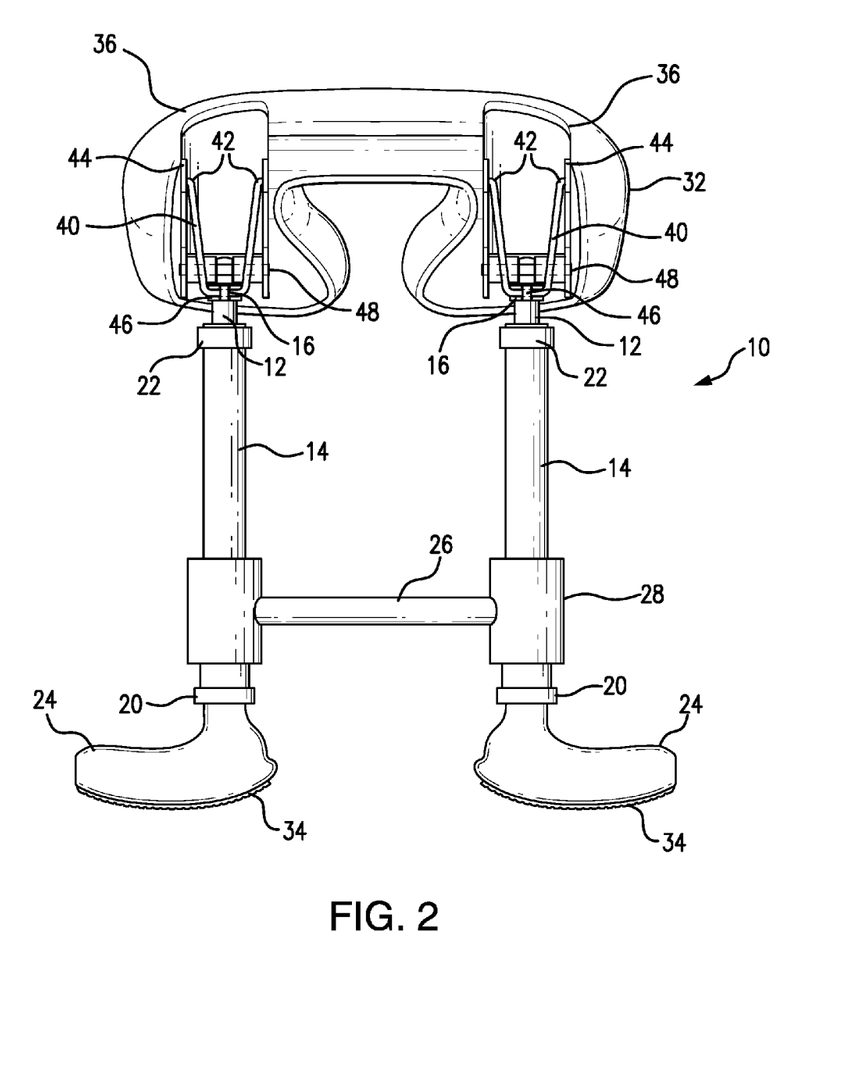
FIG. 2 is a rear perspective view of the resting apparatus.

FIG. 2 shows the rear portion of the resting apparatus 10. The leg anchors 24 have frictional padding 34 to help prevent slipping while in use and for comfort. Any pressure created by placing the user's head on the apparatus is sent to the leg anchors 24 and user's thighs or knees. This pressure is relieved by the frictional padding 34 located in the leg anchors 24. This figure also illustrates the locking mechanisms 36 that allows the user to determine the angle at which the pillow 32 will rest when engaged. The locking mechanisms 36 are attached to the upper leg distal end 16 of the upper legs 12. The locking mechanisms 36 are integrally formed with the pillow 32 and sit within a bracket groove 38 formed in the pillow 32. "Integrally formed" includes a joining together, whether joined by adhesive, heat, mechanical connection, or any other known or yet to be developed technique, or a combination thereof. The locking mechanism 36 features a u-shaped clip 40 having clip arms 42 attached to the bracket body 44 of the locking mechanism 36 by a clip bracket 46. The locking mechanism 36 also features a rotation rod 48 which allows the pillow 32 and locking mechanism 36 to freely rotate when the u-shaped clip 40 is not engaged with the locking mechanism 36.

Figures 3, 3A:
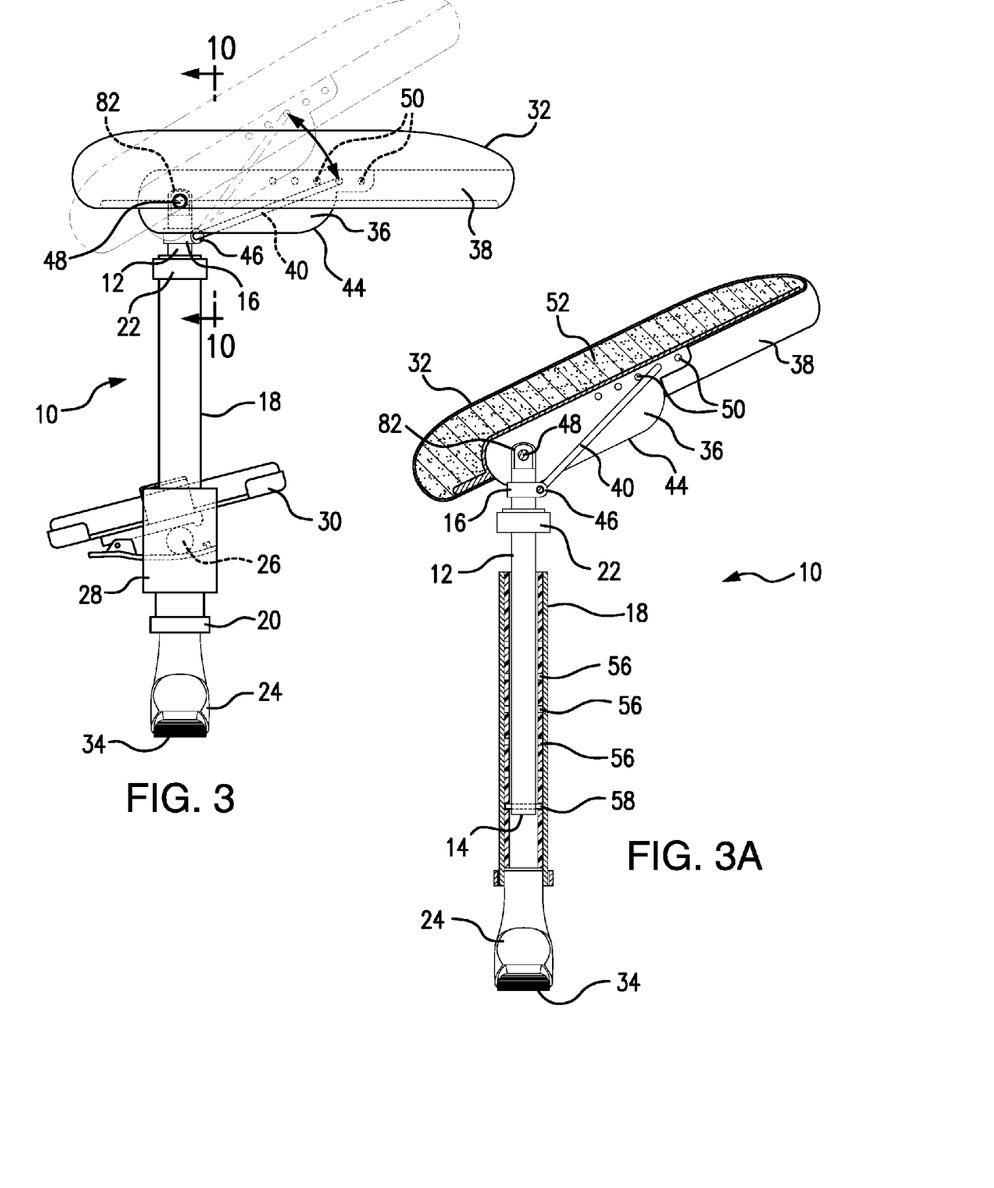
FIG. 3 is a side perspective view of the resting apparatus with notation showing rotation ability of the pillow and locking mechanism.
FIG. 3A is an axial cross-sectional view of the resting apparatus showing the side channels used to lock in resting apparatus height.

FIG. 3 illustrates one of the embodiments of the present invention. The pillow 32 is able to be rotated around the rotation rod 48 due to being integrally formed with the locking mechanism 36. The angle of the pillow 32 is determined by which of the clip slots 50 the u-shaped clip 40 engages. The angle of the pillow 32 is based on user preference. As can be seen in the figure, the pillow 32 can have a raised angle as much as 30 degrees and, not shown in the figure, can be lowered as much as 30 degrees, depending on user comfort. While in use, the user may place their phone or other media in the media clip 30 for entertainment or other uses. The distance of the media clip 30 to the user is determined by the position of the support brace 26 and the corresponding support columns 28, which can be slidably moved along the lower legs 18.

FIG. 3A provides a cross-sectional view of the resting apparatus 10. This view helps to show the telescoping and height retention abilities of the present invention. The lower leg 18 features a plurality of side channels 56. The upper leg proximal end 14 features at least a pair of extensions 58 that, when the lower leg 18 is rotated, engages the side channels 56. This results in the upper leg 12 retaining the height that the user desires.

Figure 3B:
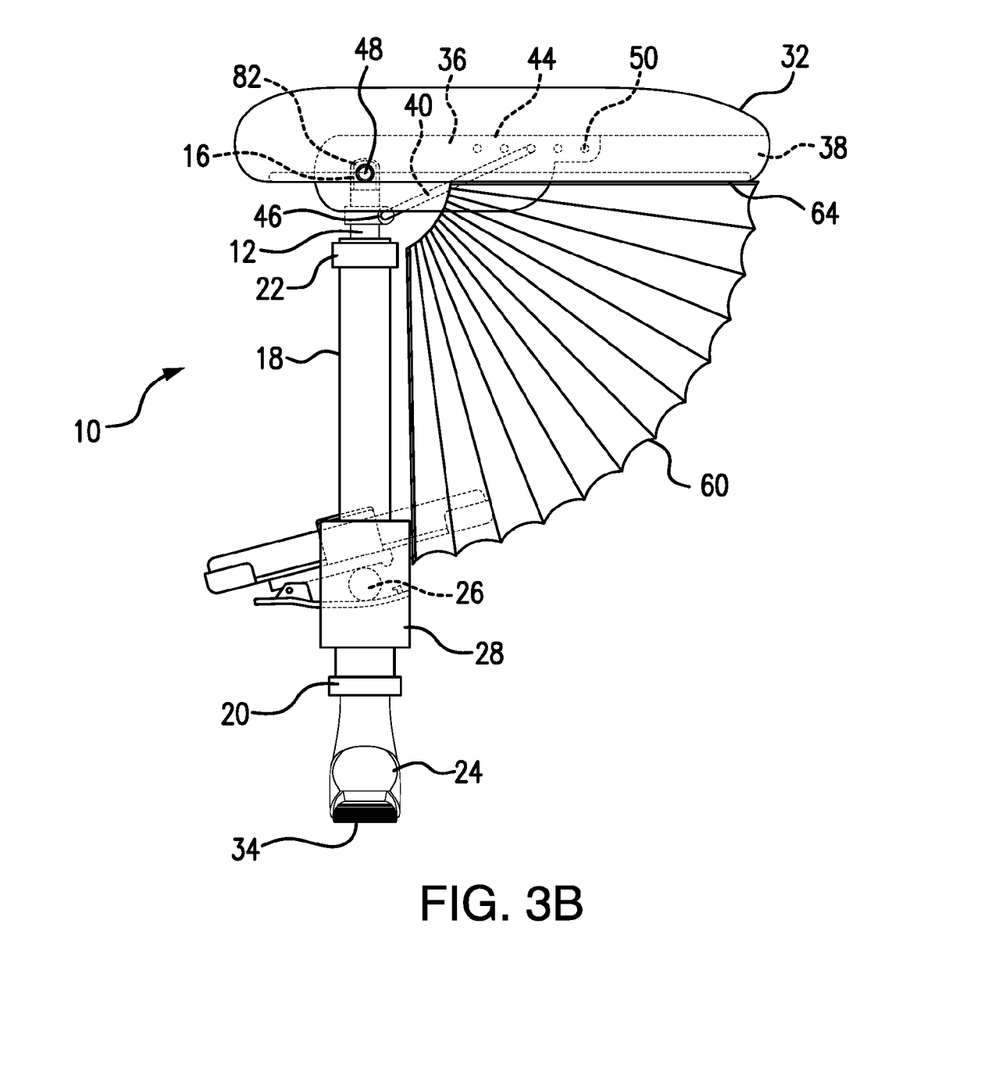
FIG. 3B is a side perspective view of the resting apparatus with the peripheral screen in the down position.

FIG. 3B is an alternative embodiment of the present invention where a peripheral screen 60 is mechanically attached to the pillow 32 such that when the user puts a phone or media device in the phone clip 30, others will not be able to see what they are watching or doing on the device. The peripheral screen 60 may have magnets or some other form of attachment such that, if the user does not want the screen 60 in the down position, the user can keep the screen 60 attached to the lower pillow face 64 and out of the way.

Figure 4:
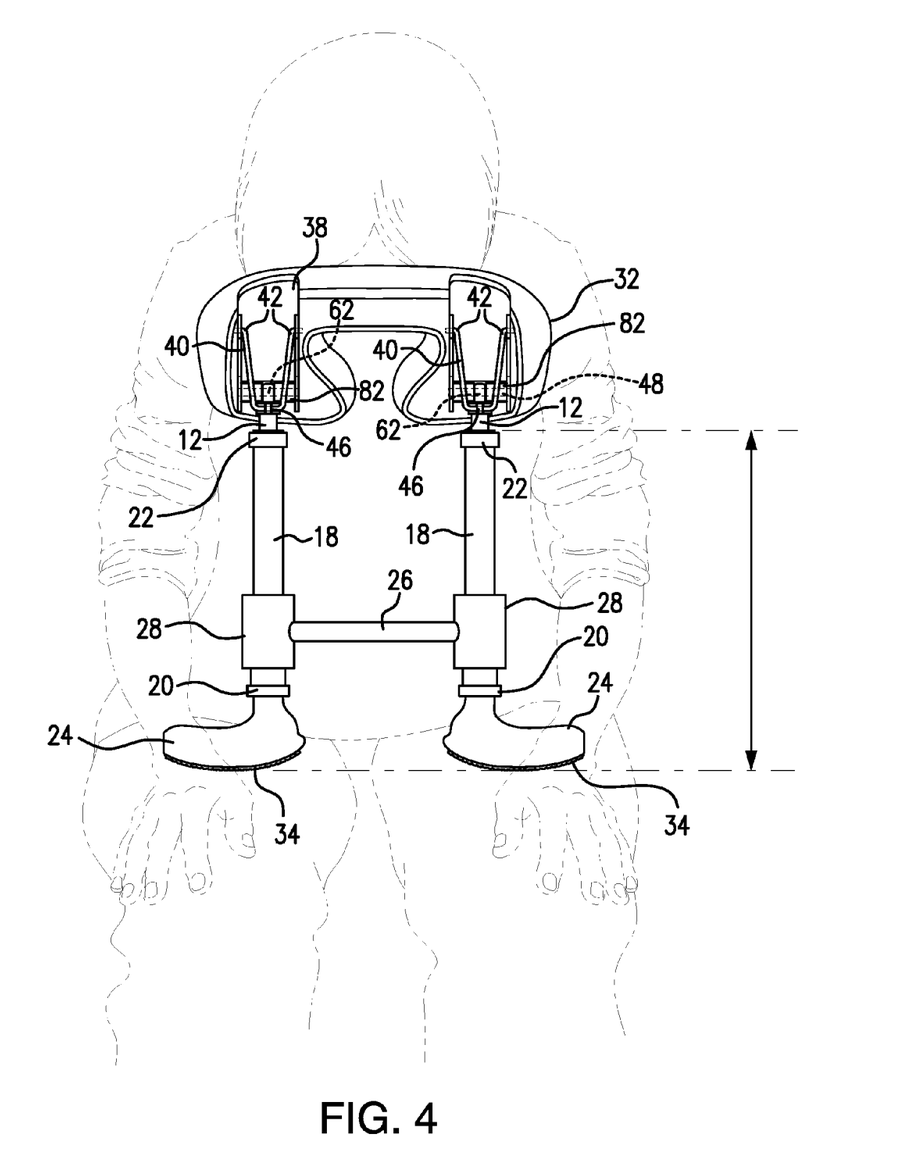
FIG. 4 is a rear perspective view of the resting apparatus in use when the user's feet are flat on the ground.
Figure 5:
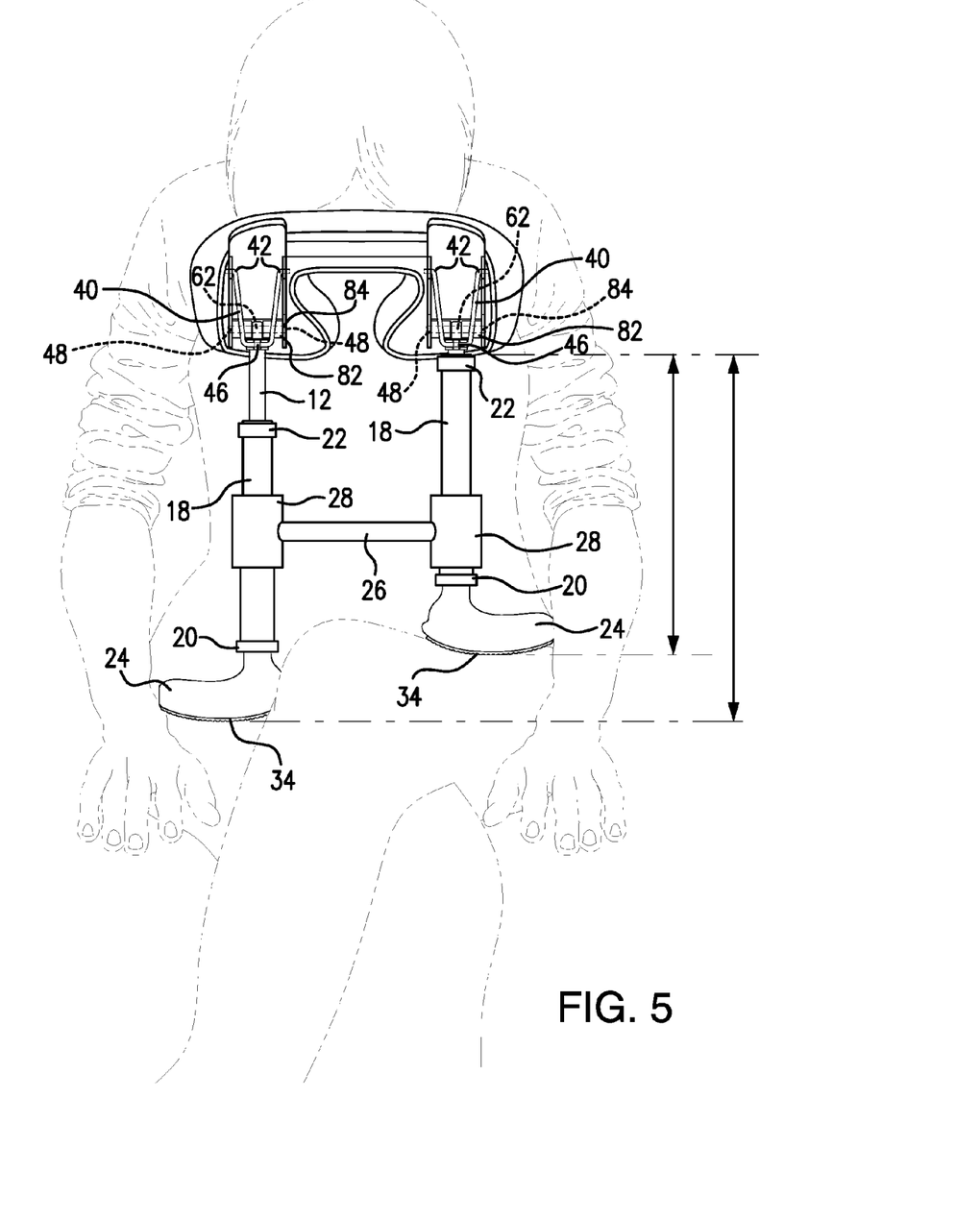
FIG. 5 is a rear perspective view of the resting apparatus in use when the user's legs are crossed.

FIGS. 4 and 5 show the resting apparatus in use. In FIG. 4, the user's feet are flat on the ground and the upper legs 12 are held at the same height. As can be seen in the selected embodiment, the locking mechanism 36 and the bracket body 44 face away from the user. In FIG. 5, the user has crossed their legs. As shown in the figure, in order to have a flat and balanced resting surface, one of the upper legs 12 needs to be in a raised position while the other remains in a lowered position. The lower legs 18 are independent of each other and may have different heights. The leg anchors 24 would then be able to rest comfortably balanced on the user's thighs or knees. Other devices do not allow for such positioning.

Figure 6:
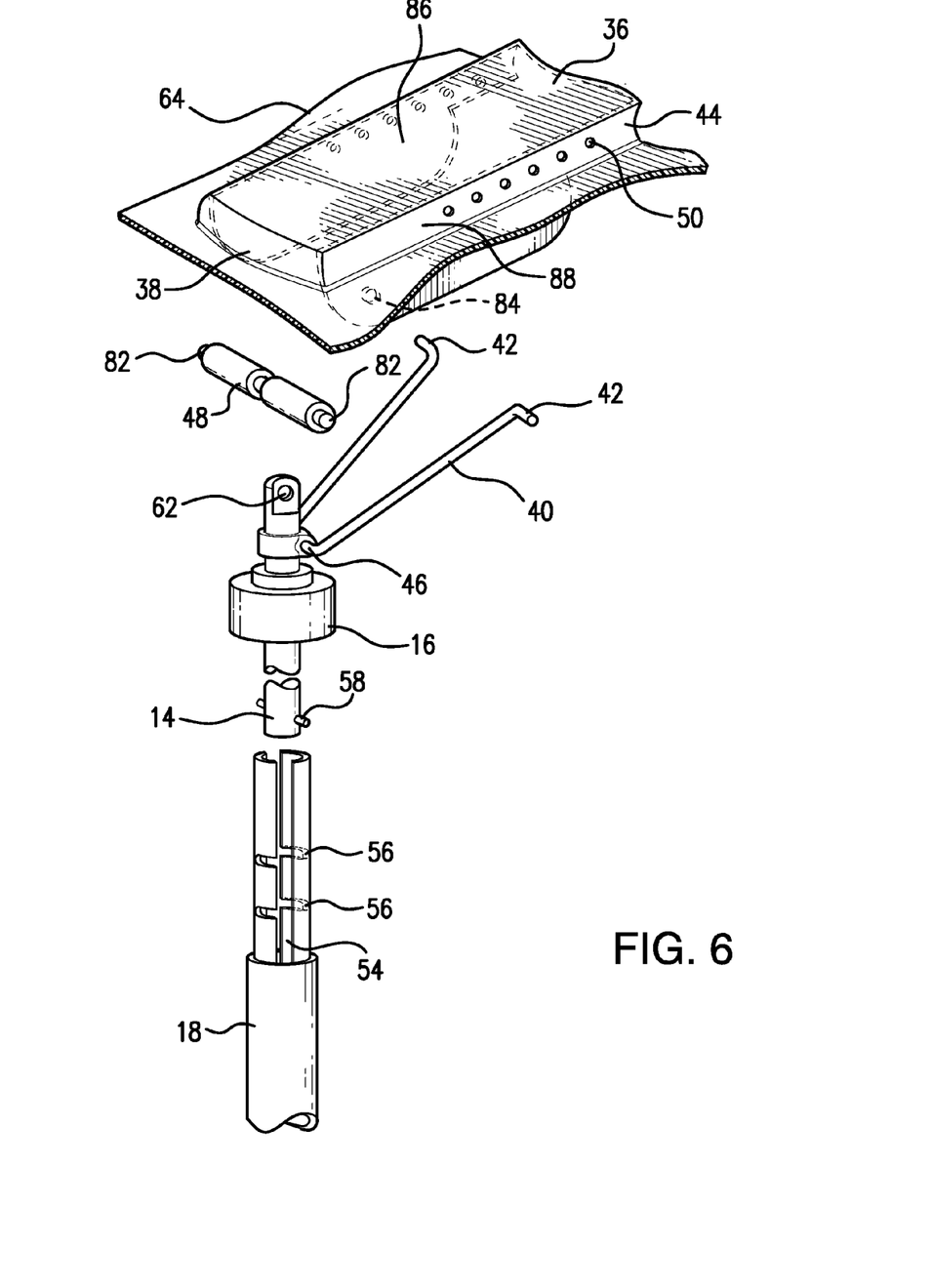
FIG. 6 is an exploded view of the locking mechanism and first channel.

FIG. 6 provides an exploded view of the locking mechanism 36 and the inner portion of the lower leg 18. The first channel 54 and side channels 56 are molded into the lower leg 18. The upper leg proximal end 14 features extensions 58 that fit into the first channel 54 and side channels 56 to retain the desired height of the resting apparatus. The lower leg 18 can be rotated so that the extensions 58 enter the first channel 54 to allow for vertical movement. The first channel 54 is molded throughout the length of the lower legs 18. Once a desired height is reached, the user would then rotate the lower legs 18 such that the extensions 58 entered one of the side channels 56 to lock the height of the upper leg 12 in place.

FIG. 6 also illustrates the locking mechanism 36 is greater detail. The u-shaped clip 40 is attached to the upper leg distal end 16 preferably using a clip bracket 46. However, the u-shaped clip 40 can be attached in a plurality of ways. The upper leg distal end 16 also features a rotation rod hole 62 for the rotation rod 48 to fit through. The rotation rod hole 62 allows for freedom of movement for when the locking mechanism 36 is not engaged by the u-shaped clip 40. The rotation rod 48 engages the bracket body 44 through rotation rod extensions 82 that enter corresponding receiving holes 84 formed in the bracket body 44. The bracket body 44 has a bracket top 86 and a pair of bracket side walls 88. In order to engage the locking mechanism 36, the u-shaped clip 40 has at least two clip arms 42 which enter one of the plurality of clips slots 50 formed within the bracket side walls 88. The bracket body 44 is integrally formed within a bracket groove 38 formed within the lower pillow face 64. There should be as many bracket grooves 38 as there are locking mechanisms 36 so that the locking mechanisms 36 can be integrally formed with the pillow 32.

Figure 7:
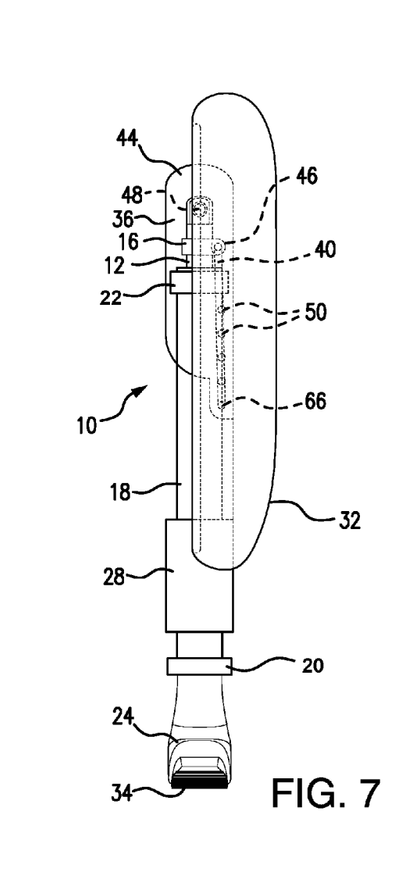
FIG. 7 is a side perspective view of the resting apparatus in travel form.
Figure 8:
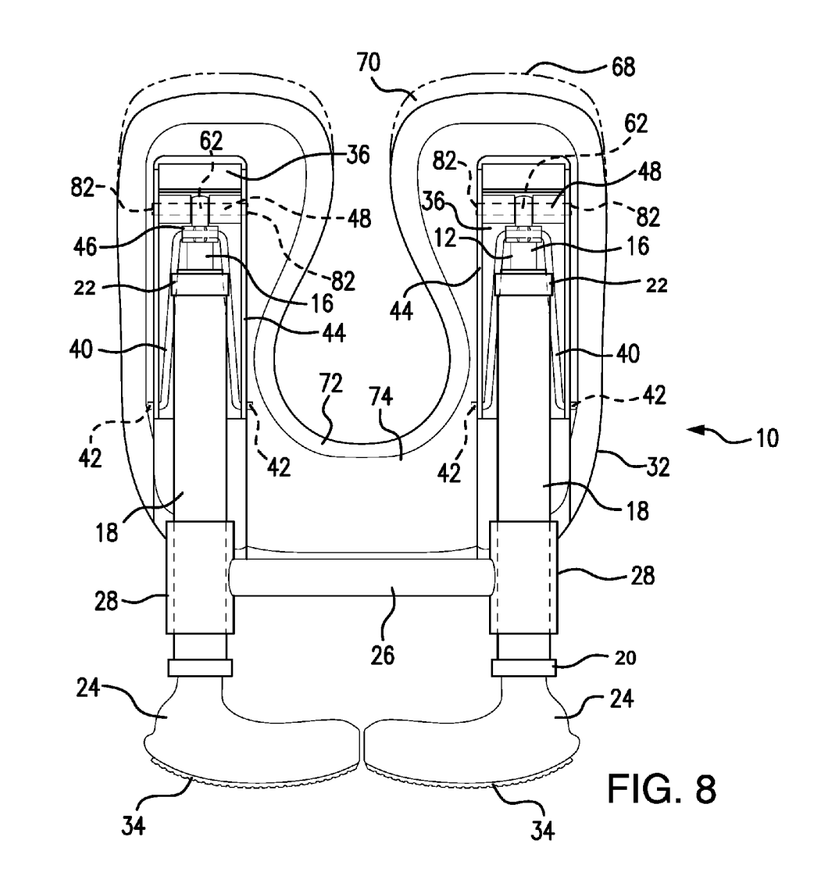
FIG. 8 is a rear perspective view of the resting apparatus in travel form.

FIGS. 7 and 8 shows the resting apparatus 10 in the traveling position. While in the traveling position, the locking mechanism 36 and upper legs 12 and lower legs 18 remain substantially within the outer boundaries of the pillow 32. In order to get to this position, the lower legs 18 should be rotated such that the extensions 58 enter the first channel 54 (not shown in figure) so that the upper legs 12 can be lowered to its minimum height. As can be seen in FIG. 8, the lower legs 18 and leg anchors 24 are preferably rotated inwardly to lock the resting apparatus 10 in position. Preferably, the pillow 32 and locking mechanism 36 will be parallel to the upper legs 12 and lower legs 18 when in the traveling position. The u-shaped clip 40 can be disengaged from the clip slots 50 or, alternatively, engage a traveling clip slot 66 so as to lock the pillow 32 in the parallel position to prevent the pillow 32 from moving while in transit. The support brace 26 and support columns 28 are preferably moved to the lower leg proximal end 20 when in the traveling position to help secure the pillow 32 in place. Preferably, the support brace 26 will have magnets or some other fastener that can attach to the pillow 32 to keep the pillow 32 in place when in the traveling position.

Also shown in FIG. 8 is an alternative embodiment whereby the pillow 32 has padding which has different densities. As illustrated by the broken lines in the figure, the frontal pillow face 68 can have high density padding 70 while the rearward pillow face 72 can have low density padding 74, as illustrated by the non-broken lines. The high density padding 70 will help support the collar bone of the user while the user has their face resting against the pillow 32. The low density padding 74 is primarily for the comfort of the user. "Low density" when used here refers to any padding density less than that of the high density padding 70. In general, the padding 52 could be any number of materials including, but not limited to, polyester, polyester pellets, microbeads, beanbag filler, foam, down and other feathers, wool, memory foam, and any other type of padding generally known in the art or some combination thereof.

Figure 9:
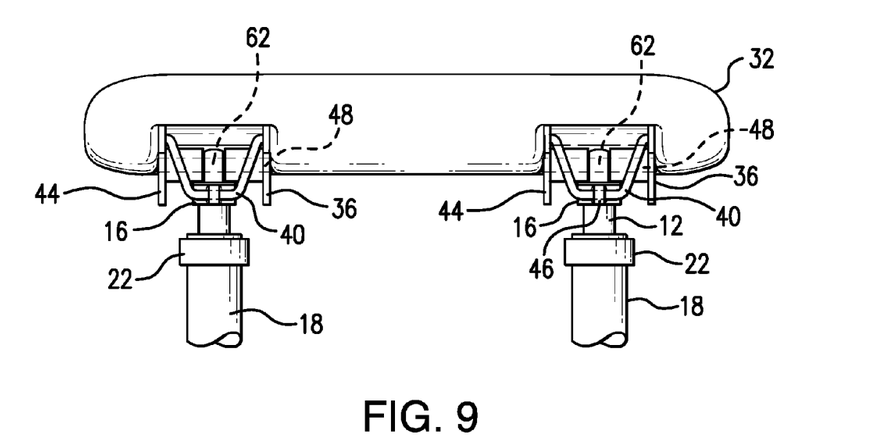
FIG. 9 is a rear perspective view focusing on the locking mechanism when the pillow is at a 90 degree angle.
Figure 10:
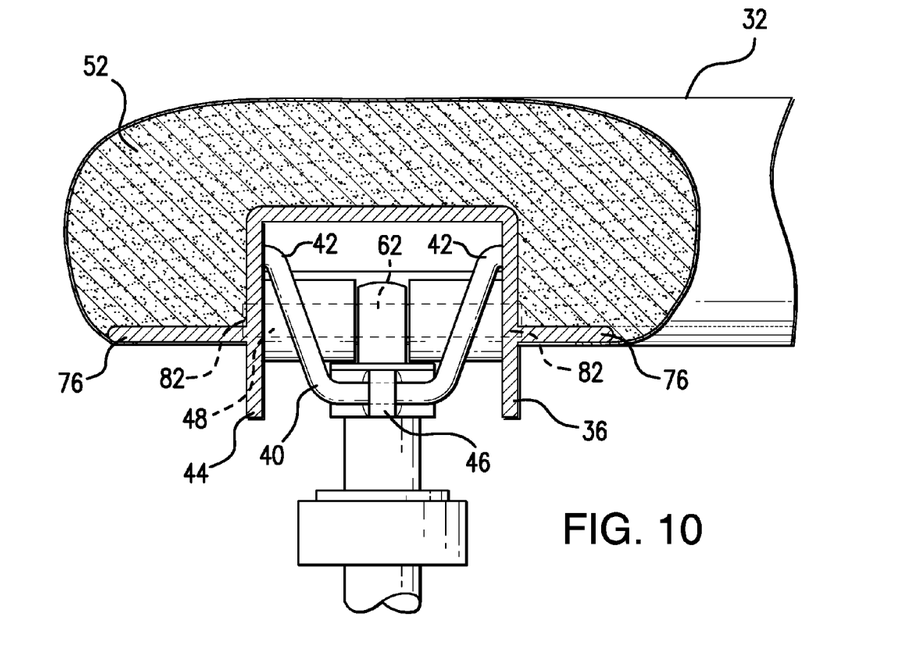
FIG. 10 is a cross sectional view of the pillow and recessed locking mechanism.

FIGS. 9 and 10 illustrate views of the rearward side of the pillow. FIG. 9 shows the upper legs 12 and locking mechanism 36 inside the bracket groove 38 formed inside the pillow 32. The u-shaped clip 40 is engaged with the clip slots 50 and holding the resting apparatus 10 in place. FIG. 10 is a cross sectional view of the pillow 32 showing the padding 52 inside. Support arms 76 keep the locking mechanism 36 in place within the bracket groove 38 and prevents damage to the underside of the pillow 32 by providing a hard surface.

Figure 11:
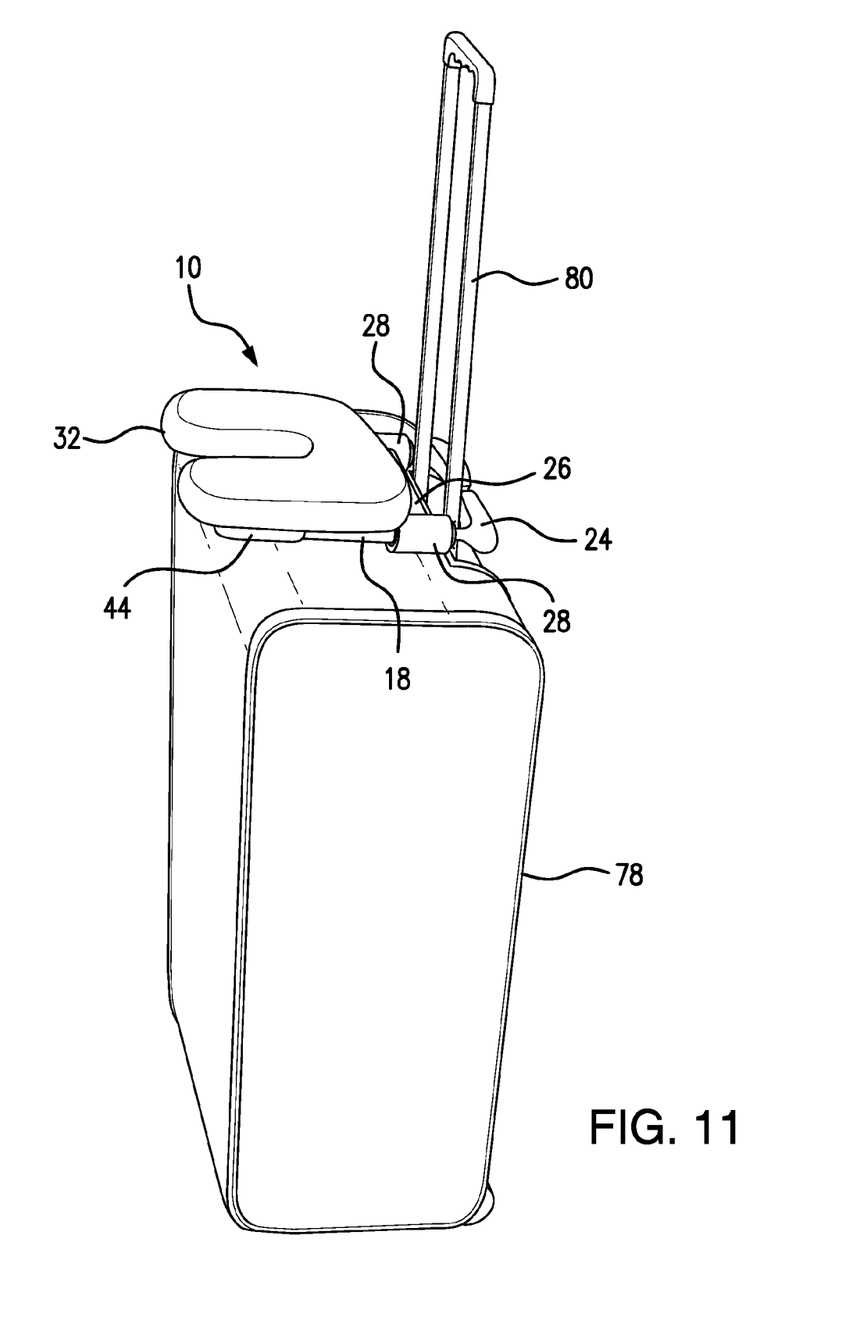
FIG. 11 is a perspective view of the resting apparatus on a suitcase when in use for travel.

FIG. 11 illustrates the preferred embodiment in a collapsed travel position while on an exemplar suitcase 78. The resting apparatus 10, when in the collapsed traveling position, features a gap between the leg anchors 24 and the support brace 26. This gap slides over the suitcase handle 80 of the suitcase 78 allowing for easy carrying. Alternatively, when the leg anchors 24 are in the collapsed traveling position, the leg anchors 24 can be used as a handle by itself, allowing the user to easily carry around the resting apparatus 10.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and methods may be resorted to without departing from the spirit and scope of the invention.

What is claimed is:
1. A resting apparatus comprising:
a pair of independently adjustable legs having proximal and distal ends with axially rotatable leg anchors on the proximal ends, wherein the independently adjustable legs each have an upper leg and lower leg, each said upper leg and each said lower leg having a proximal and distal end, the independently adjustable legs tele- scope due to each said lower leg having a circumference such that each said upper leg fits into each said lower leg;
a support brace with two vertical support columns slidably mounted on the independently adjustable legs;
a locking mechanism connected to the distal ends of the independently adjustable legs having a rotation rod supporting rotation; and
a pillow integrally formed with the locking mechanism, wherein a height of the apparatus is obtained via a first channel axially molded into each said lower leg and side channels radially molded into each said lower leg whereby each said upper leg has a plurality of extensions on the proximal end which fit into the first channel and the side channels such that when a respective said extension is in one of said side channels, a corresponding said upper leg remains in a raised position.

2. The resting apparatus of claim 1 wherein the leg anchor is permanently affixed to each of the legs and extends longitudinally from the legs.

3. The resting apparatus of claim 1 wherein the leg anchors have a bottom surface which is curved.

4. The resting apparatus of claim 1 wherein the support brace has a media support attached to the support brace.

5. The resting apparatus of claim 1 wherein the apparatus has a peripheral screen connected to the rotation rod with a similar axis of rotation as the rotation rod.

6. The resting apparatus of claim 1 wherein the locking mechanism defines a range of angles at which the pillow is held.

7. The resting apparatus of claim 1 wherein the leg anchors have frictional padding to prevent sliding.

8. The resting apparatus of claim 7 wherein the leg anchors have the frictional padding along a bottom surface to prevent sliding.

9. The resting apparatus of claim 1 wherein the locking mechanism further comprises a first locking mechanism and a second locking mechanism.

10. The resting apparatus of claim 9 wherein the first locking mechanism is required to be in a same position as the second locking mechanism at all times.

11. The resting apparatus of claim 1 wherein the locking mechanism comprises a plurality of clip slots in a bracket and a u-shaped clip with outwardly extending arms whereby the arms engage with at least one of the clip slots to lock the pillow in place.

12. The resting apparatus of claim 11 wherein the u-shaped clip is rotatably affixed within the distal end of a respective said independently adjustable leg.

13. The resting apparatus of claim 12 wherein the clip slots provide a range of motion for the pillow to be locked in place wherein the range of motion is between 30° and −30° when the u-shaped clip is engaged with the clips slots of the locking mechanism.

14. A resting apparatus comprising:
two independent legs, each leg comprising:
an upper leg;
a lower leg; and
each said upper leg and each said lower leg having a proximal and distal end, the upper and lower legs telescope due to each said lower leg having a circumference such that each said upper leg fits into each said lower leg;
an axially rotatable leg anchor affixed to an end of the lower leg, wherein the lower leg is slidably engaged within the upper leg wherein the leg anchor has a frictional padding;
a support brace slidably supporting the two independent legs;
a locking mechanism mechanically connected by a rotation rod to the two independent legs; and
a pillow integrally formed with the locking mechanism, wherein a height of the apparatus is obtained via a first channel axially molded into each said lower leg and side channels radially molded into each said lower leg whereby each said upper leg has a plurality of extensions on the proximal end which fit into the first channel and the side channels such that when a respective said extension is in one of said side channels, a corresponding said upper leg remains in a raised position.

15. A resting apparatus comprising:
two independent legs, each leg comprising:
an upper leg with an extension at a proximal end;
a lower leg configured to telescopingly fit inside the upper leg and having a first channel radially molded into the lower leg wherein the first channel is configured to fit the extension in the upper leg; and
a leg anchor affixed to an end of the lower leg;
a support brace slidably supporting the two independent legs;
a locking mechanism mechanically connected by a rotation rod to the two independent legs; and
a pillow integrally formed with the locking mechanism, wherein a height of the apparatus is obtained via the first channel radially molded into each said lower leg and side channels axially molded into each said lower leg whereby each said upper leg has a plurality of extensions on a proximal end which fit into the first channel and the side channels such that when a respective said extension is in one of said side channels, a corresponding said upper leg remains in a raised position.

* * * * *